United States Patent
Kelemen

(10) Patent No.: US 6,757,124 B2
(45) Date of Patent: Jun. 29, 2004

(54) ACTUATOR SYSTEM FOR A DISC DRIVE USING A PIEZOELECTRIC ASSEMBLY

(75) Inventor: Bradley David Kelemen, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 441 days.

(21) Appl. No.: 09/728,042

(22) Filed: Dec. 1, 2000

(65) Prior Publication Data

US 2002/0067565 A1 Jun. 6, 2002

Related U.S. Application Data

(60) Provisional application No. 60/169,017, filed on Dec. 3, 1999.

(51) Int. Cl.[7] .............................................. G11B 21/02
(52) U.S. Cl. ..................................... 360/75; 360/294.1
(58) Field of Search ........................... 360/25, 75, 290, 360/294, 294.1, 294.4, 294.2, 294.7

(56) References Cited

U.S. PATENT DOCUMENTS

| | | |
|---|---|---|
| 4,605,977 A | 8/1986 | Matthews |
| 5,130,867 A | 7/1992 | Ohashi |
| 5,166,845 A | 11/1992 | Thompson et al. |
| 5,168,413 A | 12/1992 | Coker et al. |
| 5,377,058 A | 12/1994 | Good et al. |
| 5,719,720 A * | 2/1998 | Lee .............................. 360/71 |
| 5,796,558 A * | 8/1998 | Hanrahan et al. ......... 360/294.6 |
| 6,268,983 B1 * | 7/2001 | Imada et al. .............. 360/294.3 |
| 6,310,750 B1 * | 10/2001 | Hawwa et al. ............ 360/294.6 |
| 6,501,625 B1 * | 12/2002 | Boismier et al. ......... 360/294.7 |

FOREIGN PATENT DOCUMENTS

WO     WO 98/37552     8/1998

* cited by examiner

*Primary Examiner*—David Hudspeth
*Assistant Examiner*—Jason Olson
(74) *Attorney, Agent, or Firm*—Merchant & Gould P.C.

(57) ABSTRACT

An actuator assembly of a disc drive having an actuator arm rotatably mounted adjacent a data disc. The actuator arm includes a piezoelectric assembly configured to displace a data transducer relative to the data disc. The piezoelectric assembly may include a top-left piezoelectric element, a top-right piezoelectric element, a bottom-left piezoelectric element, and a bottom-right piezoelectric element. The actuator arm also includes an hourglass-shaped arm pivot configured to bias the data transducer to a rest position.

21 Claims, 13 Drawing Sheets

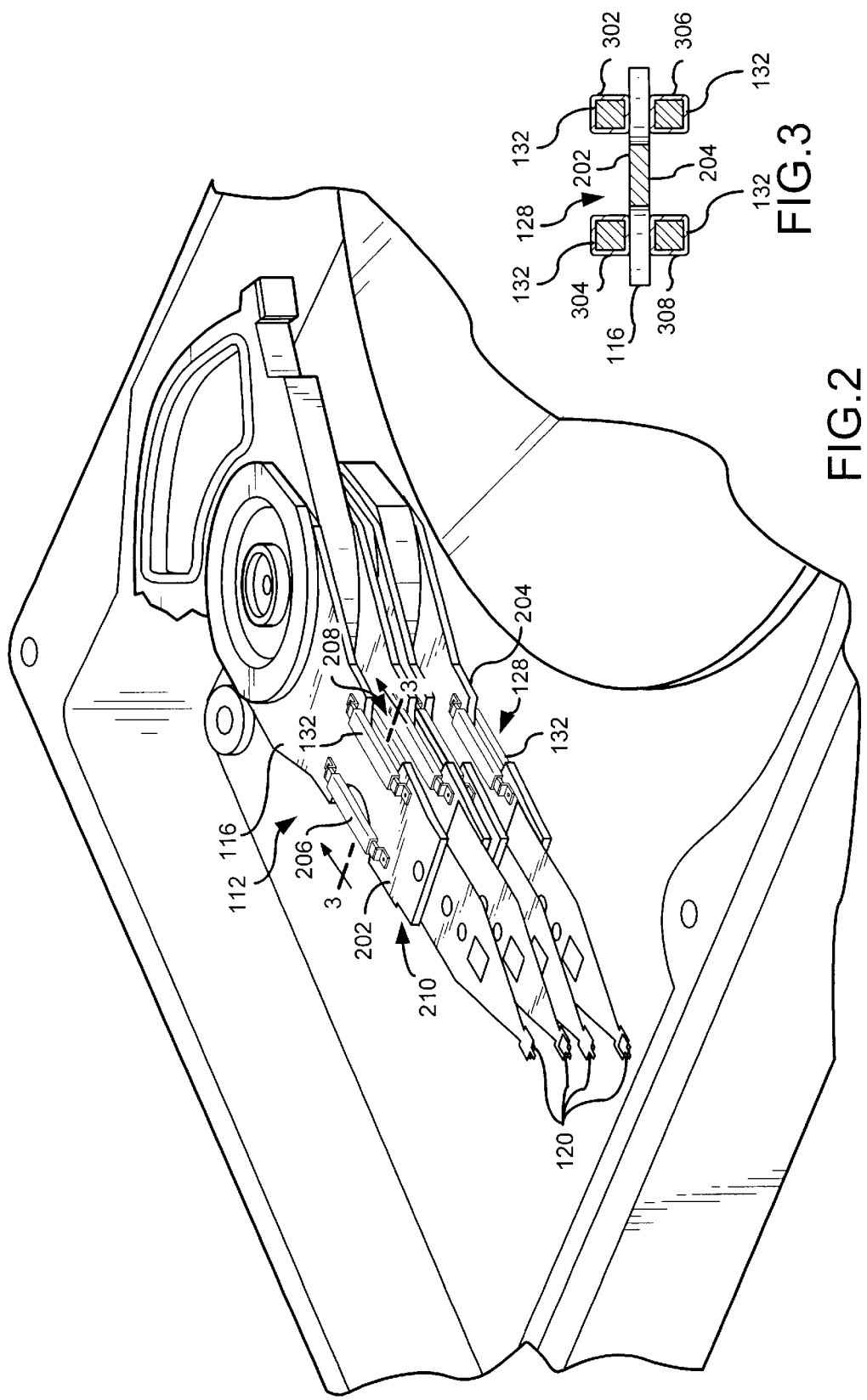

ACTUATOR SYSTEM FOR A DISC DRIVE USING A PIEZOELECTRIC ASSEMBLY

RELATED APPLICATION

This application claims priority of U.S. provisional application Serial No. 60/169,017 filed Dec. 3, 1999.

FIELD OF THE INVENTION

The present invention relates to an actuator assembly for a disc drive, and more specifically to an actuator assembly configured with one or more piezoelectric elements.

BACKGROUND OF THE INVENTION

Disc drives are data storage devices that preserve digital data in magnetic form on a magnetizable medium. Typically, the magnetizable medium is coated on one or more rigid data discs mounted on a hub of a spindle motor. The spindle motor rotates the discs at a constant high speed as data transducers move radially along the data disc surface reading and writing data. During a write operation, a transducer magnetizes data onto the disc and during a read operation the transducer senses data previously written on the disc. A seek operation refers to the repositioning of the data transducer over a new data location on the disc. In general, each data transducer is mounted on an actuator assembly which moves the transducer to a desired location on the data disc.

Accurate vertical positioning of data transducers over data discs is critical to the operation of a disc drive. If a data transducer is too high above the data disc, for example, the transducer may be unable to detect disc data during a read operation and may be unable to magnetize the data disc during a write operation. Furthermore, decreasing the vertical distance between the transducer and the disc (also known as "fly height") allows more data to be stored on a disc. However, if the transducer moves too close to the data disc, transducer-disc contact may occur. Transducer-disc contact generally causes debris to deposit on the disc surface and can result in a dreaded disc crash over time. Thus, disc drive manufacturers generally strive to bring the average fly height of data transducers as close as possible to data discs while keeping transducer-disc contact due to fly height errors to an acceptable minimum.

Variations in average transducer fly height from an optimal operating altitude are typically attributed to component manufacturing errors that cumulatively cause the transducer to be positioned either too low or too high from the data disc. Such manufacturing variations and tolerances typically exist for every part on a microscopic level in a disc drive assembly. For example, manufacturing variations in disc spacers, which separate data discs in a multi-disc disc drive, can lead to a sub-optimal average transducer fly height. Similarly, the actuator assembly may be mounted either too low or too high from the data disc.

Besides errors associated with average transducer height, transitory variations in fly height may also cause data errors during a disc drive's operation. One major cause of inconsistent transducer fly height is minute variations in the data disc's topography. Data discs are never perfectly flat and contain microscopic peaks and valleys. Such topographical inconsistencies can result in the data transducer flying too far or too near the data disc. Another reason for fly height variations is disc wobble as the disc is rotated about the spindle motor. Imperfections in the spindle motor or disc spacers may lead to unbalanced motion of the discs, thus causing the data discs to wobble back and forth. When disc wobble occurs, the fly height of the data transducer changes as portions of the data disc move closer to the data transducer, while other portions of the data disc move farther away from the data transducer. Along similar lines, the movement of the data discs as a result of vibrations, also referred to as "disc flutter," can produce transducer fly height variations.

One known actuator structure that helps overcome some causes of transducer fly height variations utilizes an air bearing responsive to changes in fly height. In this arrangement, a flexture is mounted to the end of the actuator arm and pushes the data transducer toward the data disc. The amount of force exerted by the flexure is often referred to as the flexure gram load. Counterbalancing the flexure gram load is the air pressure created between the transducer and data disc when the disc spins rapidly below the transducer. The air pressure acts to lift the transducer away from the disc much like an airplane wing. As a result of these two opposing forces, the data transducer flies over the rotating disc surface at a relatively constant height, rising when the disc surface advances closer to the transducer and falling when the disc surface retreats away from the transducer.

Although an actuator assembly that incorporates the air bearing design described above helps maintain consistent transducer fly height, such an actuator has several shortcomings. Typically, the flexure gram load must fall within tight tolerances for the actuator to properly function. If the gram load is too large, the air pressure created will not be enough to sufficiently lift the transducer over the disc surface. Conversely, if the gram load is too low, the transducer will be lifted too high above the disc surface. As transducers are required to fly ever closer to data discs for increased disc storage capacity, gram load tolerances of conventional air bearing actuators will continue to tighten and actuator flextures meeting such tolerances may become harder to manufacture.

In addition, the air bearing actuator design can create new sources of transducer fly height errors. Since the air bearing design relies on air pressure to counterbalance the flexure gram load and lift the data transducer, factors affecting air pressure between the transducer and the disc also affect the transducer fly height. For example, variations in the operating environment of the disc drive, such as changes in elevation and temperature, can change the air pressure produced between the transducer and the disc, thus altering the transducer fly height. Changes in fly height due to such external factors cannot be easily compensated for during manufacturing and are generally considered inherent to disc drive's operation. Thus, such external factors may ultimately limit how closely transducers fly above data discs with conventional air bearing assemblies.

Beyond the above-mentioned sources for transducer-disc contact, collisions may also result when an actuator is moved radially across the data disc. For example, as the actuator assembly quickly accelerates and decelerates during seek operations it may twist slightly, causing the data transducer to roll and collide into the disc surface. Moreover, some disc drives employ a transducer parking-ramp to lift the transducer away from the data disc when the drive is not in use. Often times, a transducer edge may catch the data disc surface when the transducer is loaded and unloaded to and from the ramp.

SUMMARY OF THE INVENTION

In accordance with the present invention, the above and other problems are solved by providing a piezoelectric assembly in an actuator arm for fine-tuning the position of the data transducer. As such, the invention allows for fly height error correction due to both internal and external disc drive factors. In addition, the piezoelectric assembly of the present invention provides fly height feedback for optimal vertical placement of data transducers above the data discs. Furthermore, the invention may be configured to alert users with an early warning of an imminent catastrophic disc crash. The present invention may also be used to compensate for data transducer roll, as well as to make small radial adjustments of the transducer position across a data disc.

Thus, the present invention generally involves an actuator arm for a disc drive having at least one data disc. The actuator arm includes a data transducer coupled with the actuator arm for reading and writing data from and to the data disc. The actuator arm also includes a piezoelectric assembly with at least one piezoelectric element. The piezoelectric element is configured to vertically displace the data transducer when it is energized. The actuator arm further includes an hourglass shaped arm pivot biasing the actuator arm to a rest position.

The piezoelectric assembly may include at least one top piezoelectric element and at least one bottom piezoelectric element. Similarly, the piezoelectric assembly may include at least one left piezoelectric element and at least one right piezoelectric element. Furthermore, the piezoelectric assembly may include a top right piezoelectric element, a top left piezoelectric element, a bottom left piezoelectric element, and a bottom right piezoelectric element.

The piezoelectric assembly may be configured to roll the data transducer in clockwise and counterclockwise direction. The piezoelectric assembly can also be configured to radially displace the data transducer across the data disc.

Another embodiment of the invention is a method of positioning a data transducer for reading and writing data from and to a data disc. The method includes the step of energizing an actuator assembly motor such that the data transducer moves substantially radially across the data disc. The method also includes the step of applying a position signal to at least one piezoelectric element mounted on the actuator arm, and thereby causing the piezoelectric element to vertically displace the data transducer with respect to the data disc in response to the position signal.

The method may further involve the steps of detecting a contact signal from the piezoelectric element and comparing the contact signal to an upper contact limit. If the contact signal is greater than the upper contact limit, the method further involves the step of modifying the position signal to the piezoelectric element until the contact signal is less than the upper contact limit. In addition, the method can include the steps of comparing the contact signal to an lower contact limit and, if the contact signal is less than the lower contact limit, modifying the position signal to the piezoelectric element until the contact signal is greater than the lower contact limit.

Another aspect of the method includes the steps of detecting a contact signal from the piezoelectric element and comparing the contact signal to an imminent failure limit. If the contact signal is greater than the imminent failure limit, the method further involves the step of issuing an imminent failure warning.

Another aspect of the method includes an actuator arm for a disc drive having at least one data disc. The actuator arm includes a data transducer coupled with the actuator arm for reading and writing data from and to the data disc. A piezoelectric assembly including at least one piezoelectric element is configured to vertically displace the data transducer when the piezoelectric element is energized. The piezoelectric assembly provides a contact signal proportional to a rate of contact between the data transducer and the data disc. The actuator arm further includes a servo unit coupled to the piezoelectric assembly, wherein the servo unit is configured to energize the piezoelectric assembly in response to the contact signal such that a feedback loop is formed.

These and various other features as well as advantages, which characterize the present invention, will be apparent from a reading of the following detailed description and a review of the associated drawings.

BRIEF DESCRIPTION OF THE DRAWINGS

FIG. 2 shows one embodiment of an actuator assembly in accordance with the present invention.

FIG. 3 shows a cross-sectional view of an actuator arm along section line 3—3 of FIG. 2.

DETAILED DESCRIPTION

Figure 1:
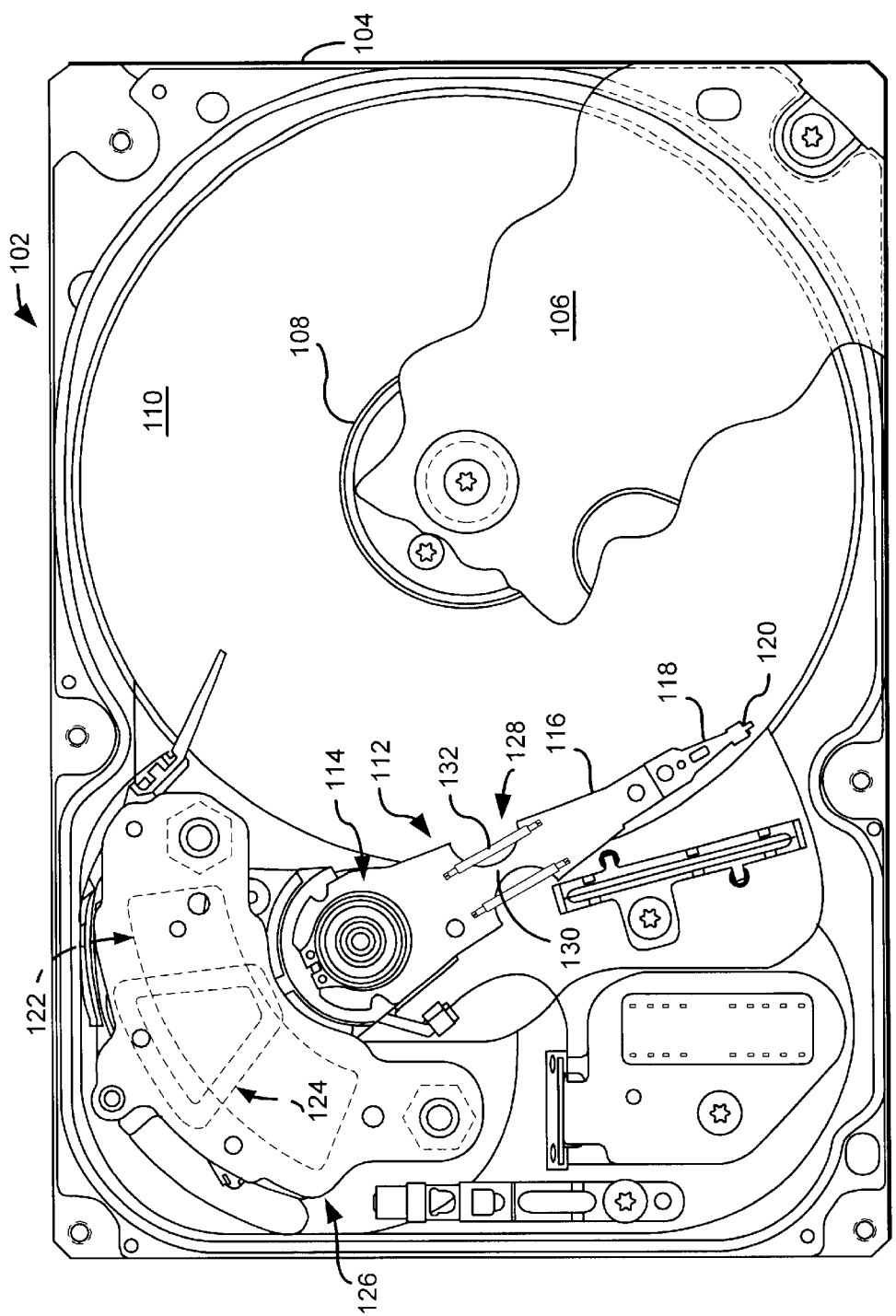
FIG. 1 shows a disc drive constructed in accordance with an embodiment of the present invention.

The invention is described in detail below with reference to the figures. When referring to the figures, like structures and elements shown throughout are indicated with like reference numerals.

A disc drive 102 constructed in accordance with an embodiment of the present invention is shown in FIG. 1. The disc drive 102 includes a base 104 to which various components of the disc drive are mounted. A top cover 106, shown partially cut away, cooperates with the base 104 to form an internal field environment for the disc drive in a conventional manner. The components of the disc drive 102 include a spindle motor 108 which rotates one or more discs 110 at a constant high speed. Information is written to and read from tracks on the discs 110 through the use of an actuator assembly 112, which rotates during a seek operation about a bearing shaft assembly 114 positioned adjacent to the discs 110. The actuator assembly 112 includes one or more actuator arms 116 which extend toward the discs 110, with one or more head gimbal assemblies 118 extending from a proximate end of each of the actuator arms 116. Mounted at one end of each of the head gimbal assemblies 118 is at least one data transducer 120 which includes an air-bearing slider enabling the transducer 120 to fly in close proximity above the corresponding surface of the associated data disc 110.

During a seek operation, the track position of the data transducers 120 is controlled through the use of a voice coil motor (VCM) 126, which typically includes an actuator coil 124 attached to the actuator assembly 112, as well as one or more permanent magnets 122 establishing a magnetic field in which the actuator coil 124 is immersed. Controlled application of current to the actuator coil 124 causes magnetic interaction between the permanent magnets 122 and the actuator coil 124 so that the actuator coil 124 moves in accordance with the well known Lorentz relationship. As the actuator coil 124 moves, the actuator assembly 112 rotates about the bearing shaft assembly 114, and the data transducers 120 are caused to move across the surfaces of the discs 110.

In accordance with the present invention, the actuator assembly 112 includes a piezoelectric assembly 128 configured to displace the actuator arm 116 about an arm pivot 130 when energized. The piezoelectric assembly 128 includes at least one piezoelectric element 132 which mechanically deforms when an electric potential is applied. By exploiting this property, the piezoelectric assembly 128 can be used to adjust the fly height of the data transducer 120, adjust the radial position of the data transducer 120 across the data disc 110, and roll the data transducer 120 clockwise and counterclockwise. The actuator assembly 128 can therefore help correct data transducer positioning errors resulting from the disc drive manufacturing process and the external disc drive environment, as described in detail below.

FIG. 2 shows one embodiment of the actuator assembly 112 contemplated by the present invention. In this embodiment, the actuator assembly 112 contains a stacked configuration of actuator arms 116 for a multiple-disc disc drive. Each actuator arm 116 corresponds to a data disc surface that is read and written by a dedicated data transducer 120. Each actuator arm 116 also includes a separately controlled piezoelectric assembly 128 for independent data transducer 120 positioning. In this manner, the placement of each data transducer 120 on the stacked actuator assembly 112 can be individually adjusted through the piezoelectric assembly 128.

The piezoelectric assembly 128 includes crystal elements 132 such as, but not limited to, quartz, tourmaline blissom, barium titanate, or lead zirconate titanate, which exhibit piezoelectric properties. As well known in the art, such crystals change in physical dimension when inserted into an electric field. The amount of physical distortion undergone by the crystals is typically proportional to the strength of the electric field applied. Furthermore, the direction of crystal deformation is dependent of the direction of the applied electric field.

In FIG. 3, a cross-sectional view of a portion of the actuator arm 116 along section line 3—3 is shown. The cross sectional view reveals that the actuator arm 116 includes a piezoelectric assembly 128 having four piezoelectric elements 132. Specifically, a top-right piezoelectric element 302 and a top-left piezoelectric element 304 are mounted to a top surface 202 of the actuator arm 116, and a bottom-right piezoelectric element 306 and a bottom-left piezoelectric element 308 are mounted to a bottom surface 204 of the actuator arm 116. Various fastening methodologies may be used to mount the piezoelectric elements 132 to the actuator arm 116, including soldering, chemically attaching, and bolting the piezoelectric elements 132 to the actuator arm 116.

Referring back to FIG. 2, the actuator arm 116 also includes an arm pivot 130 configured to translate piezoelectric element movement to actuator arm displacement. In the embodiment shown, the arm pivot 130 is integrated with the actuator arm 116 and defines a left semi-circular pivot gap 206 and a right semi-circular pivot gap 208, thus forming an hourglass shape. The arm pivot 130 is biased to a rest position 210 and is designed to elastically bend in various directions when force from the piezoelectric assembly 128 is applied. It is contemplated that other arm pivot gap shapes, such as triangular gaps, may be used in the present invention.

Figure 4:
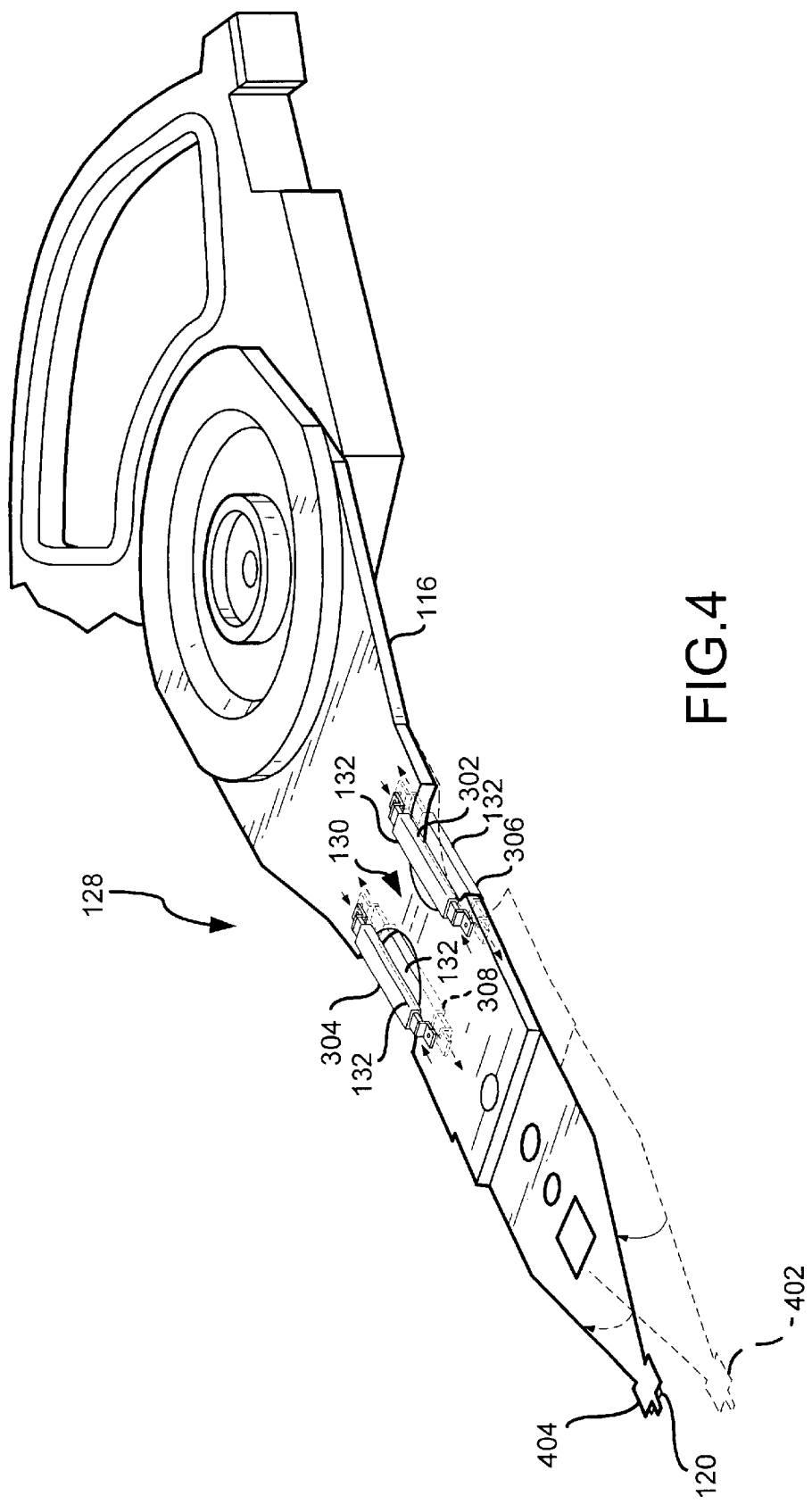
FIG. 4 shows an actuator arm pivoted in an upwardly direction using the piezoelectric assembly of the present invention.

FIG. 4 shows an actuator arm 116 bent in an upwardly direction using the piezoelectric assembly 128 of the present invention. In this configuration, voltage is applied to the top-right and top-left (302 and 304) piezoelectric elements in a polarity that causes their lengths to decrease. Furthermore, voltage is applied to the bottom-right and bottom-left (306 and 308) piezoelectric elements, but in a polarity that causes their lengths to increase. The resulting effect of the shortened top piezoelectric elements (302 and 304) and the lengthened bottom piezoelectric elements (306 and 308) is that the actuator arm 116 curves upwardly along the arm pivot 130. As the actuator arm 116 is moved upwardly by the piezoelectric assembly 128, the data transducer 120 is vertically displaced from a rest position 402 to an upper position 404. The amount of vertical displacement of the data transducer 120 is proportional to the magnitude of the voltage applied to the piezoelectric elements 132.

Figure 5:
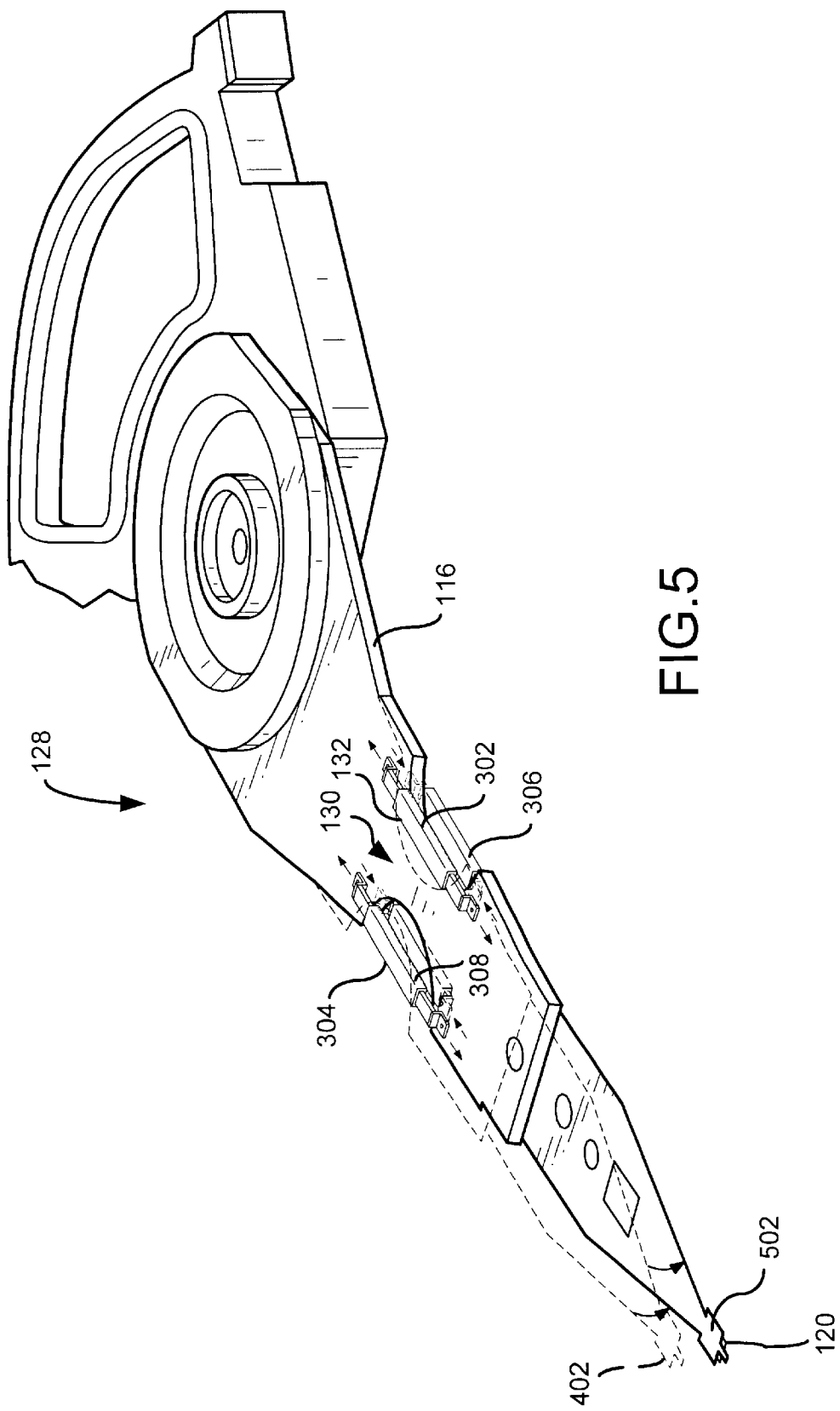
FIG. 5 shows an actuator arm pivoted in a downwardly direction using the piezoelectric assembly of the present invention.

In FIG. 5, the actuator arm 116 is shown curved in a downwardly direction using the piezoelectric assembly 128 of the present invention. Such a configuration is the reverse arrangement of the preceding discussion. For example, voltage is applied to the top-right and top-left (302 and 304) piezoelectric elements in a polarity that causes their lengths to increase, and voltage is applied to the bottom-right and bottom-left (306 and 308) piezoelectric elements in a polarity that causes their lengths to decrease. The resulting effect of the lengthened top piezoelectric elements (302 and 304) and the shortened bottom piezoelectric elements (306 and 308) is that the actuator arm 116 bends downwardly along the arm pivot 130. As the actuator arm 116 is moved downwardly by the piezoelectric assembly 128, the data transducer 120 is vertically displaced from the rest position 402 to a lower position 502. Again, the amount of vertical displacement of the data transducer 120 is proportional to the magnitude of the voltage applied to the piezoelectric elements 132.

Figure 6:
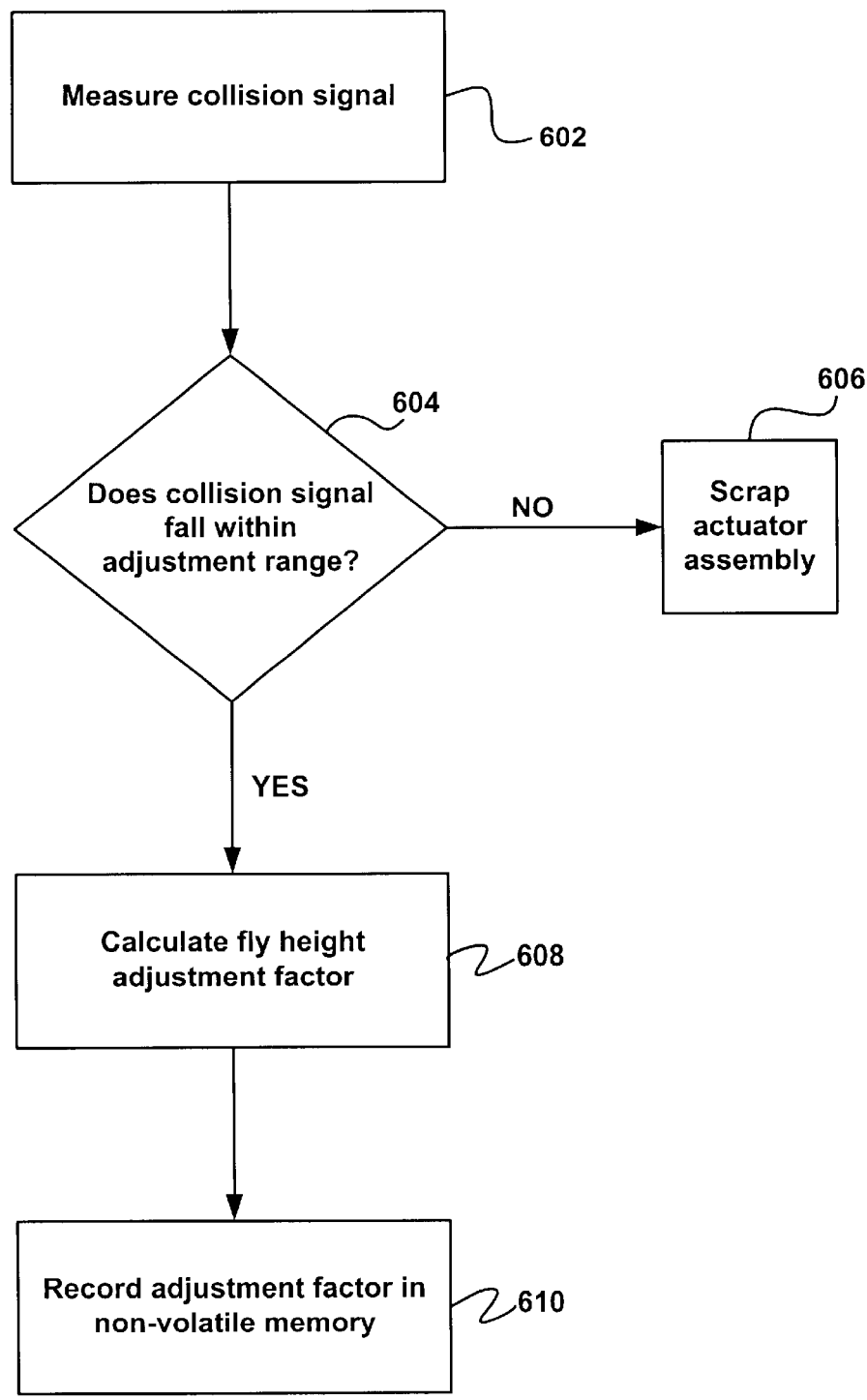
FIG. 6 shows an exemplary manufacturing sub-process contemplated by the present invention which compensates for manufacturing errors during actuator assembly manufacturing.

By providing a vertical position adjustment for the data transducer, the present invention can be used to correct actuator assembly manufacturing variations and bring the transducer closer to an optimal fly height range. For example, FIG. 6 shows an exemplary manufacturing sub-process contemplated by the present invention which compensates for component variations and manufacturing errors which occur during the disc drive manufacturing process. As discussed earlier, small manufacturing variations of components in the disc drive can cumulatively cause the transducer fly height to deviate from an optimal operating altitude.

Referring to FIG. 6, the sub-process initially measures a disc contact signal of an actuator assembly in measurement operation 602. In decision operation 604, the measured contact signal is compared with an adjustment range. If the contact signal falls outside the adjustment range, the vertical adjustment required is too large for the piezoelectric assembly to achieve and the actuator assembly is discarded in operation 606. If the contact signal falls within the adjustment range, an adjustment factor is calculated for the actuator assembly in operation 608. The adjustment factor provides the magnitude and direction of an electrical field required to be applied to the piezoelectric assembly to bring the transducer to an optimal fly height using the particular flexure. At step 610, the adjustment factor is stored in non-volatile memory, such as the data disc, an EPROM or flash memory, within the disc drive. Thus, when the disc drive is powered up, the adjustment factor is retrieved from memory and the piezoelectric assembly is initialized to an optimal fly height setting specified by the adjustment factor.

In another embodiment of the invention, the piezoelectric assembly 128 is configured to move the data transducer 120 to the lower position 502 during read and write operations. When the disc drive is not carrying out read and write operations (i.e. a seek operation), the piezoelectric assembly 128 is configured to hold the data transducer 120 at the upper position 404. This embodiment helps reduce the frequency of transducer-disc contact, thereby prolonging the operating life of the disc drive 102. Other variations of this embodiment are also contemplated where the piezoelectric assembly 128 is configured to move the data transducer 120 to a rest position 402 rather than either the lower position 502 or the upper position 404.

Figure 7:
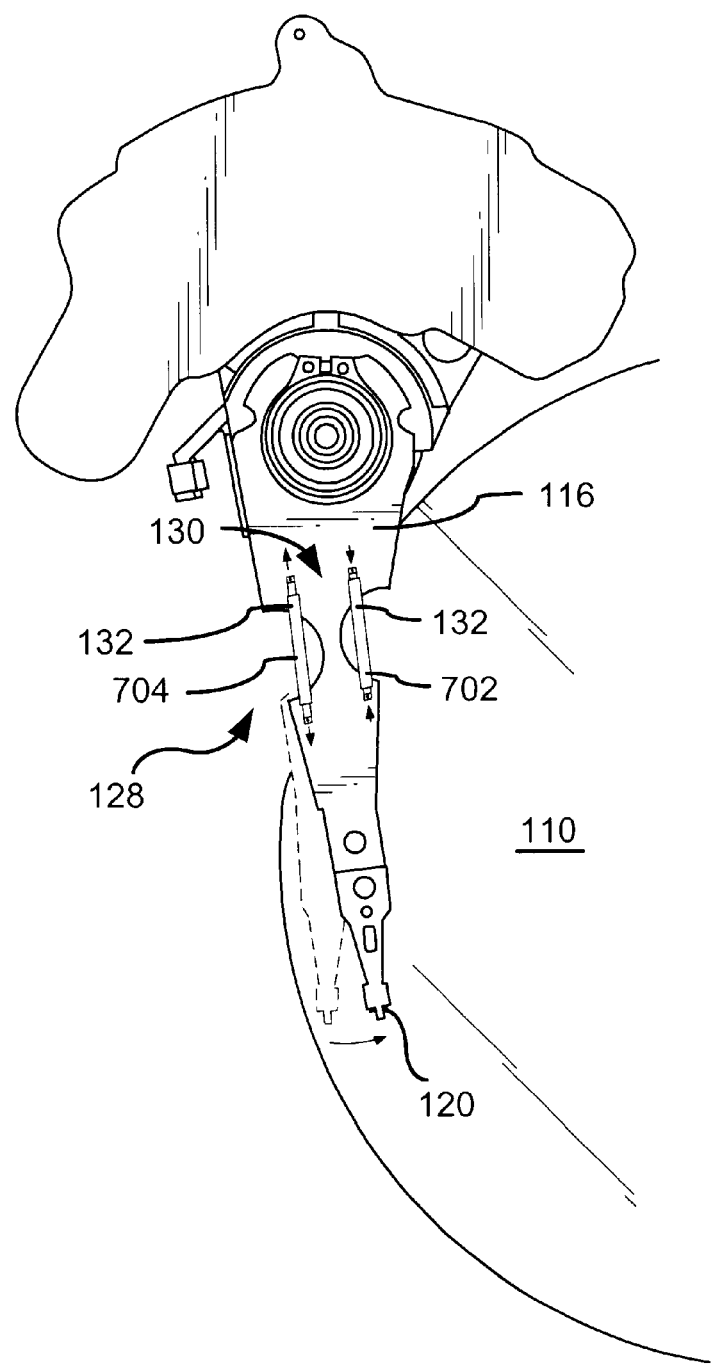
FIG. 7 shows an actuator arm pivoted radially toward a data disc using the piezoelectric assembly of the present invention.
Figure 8:
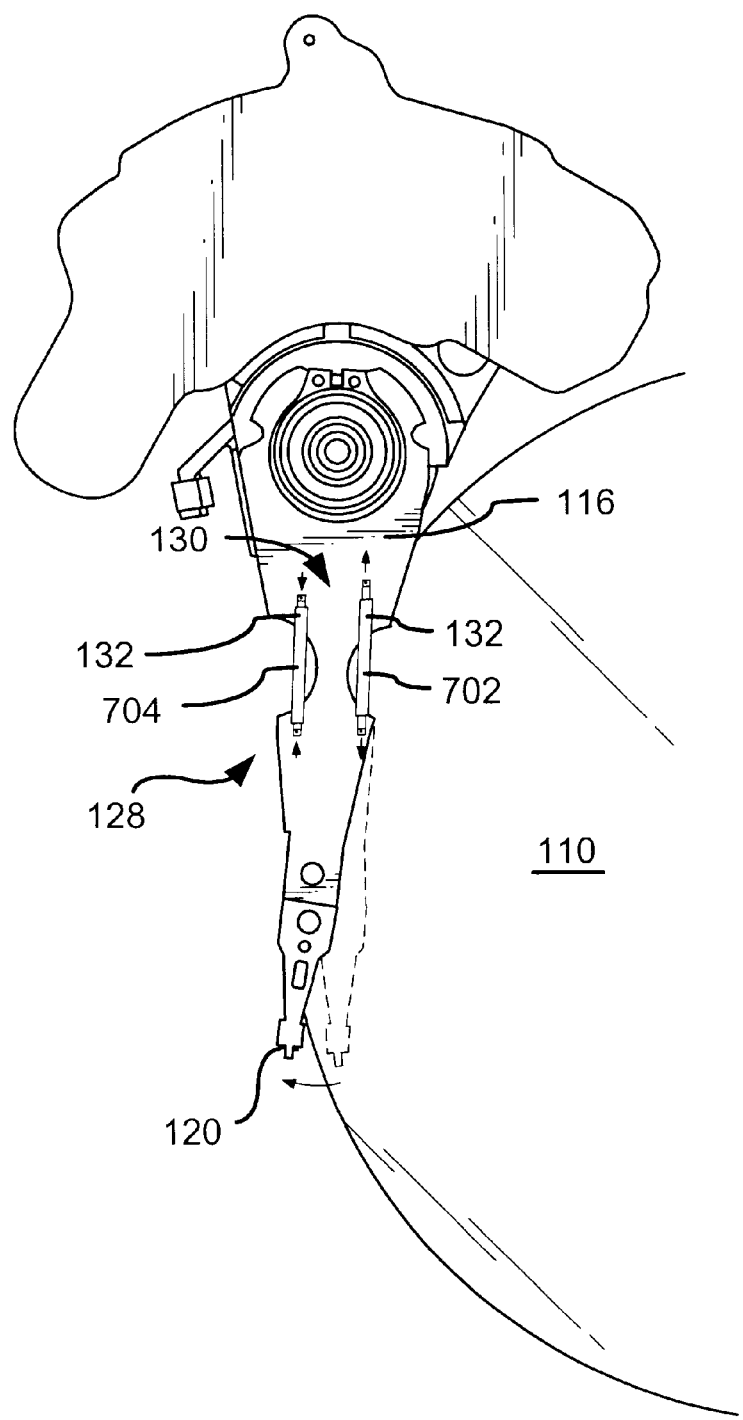
FIG. 8 shows an actuator arm pivoted radially away from a data disc using the piezoelectric assembly of the present invention.

With reference now to FIG. 7 and FIG. 8, another embodiment of the present invention is shown. In this embodiment, the piezoelectric assembly 128 includes two piezoelectric elements 132 that are used to adjust the radial position of the data transducer 120 in addition to vertical position of the data transducer 120. Side-to-side movement of the data transducer 120 is accomplished by contracting the piezoelectric elements 132 on one side of the actuator arm 116 while expanding the piezoelectric elements 132 on the other side of the actuator arm 116. Thus, the pulling force on one side of the actuator arm 116 and the pushing force on the other side of the actuator arm 116 cooperate to radially pivot the actuator arm 116 about the arm pivot 130 across the data disc 110. For example, in FIG. 7, the data transducer 120 is caused to move radially toward the center of the data disc 110 by shortening a right piezoelectric element 702 and lengthening a left piezoelectric element 704. In FIG. 8, the data transducer 120 is caused to move radially away from the center of the data disc 110 by lengthening the right piezoelectric element 702 and shortening the left piezoelectric element 704. The amount of radial displacement of the data transducer 120 across the data disc 110 is proportional to the magnitude of the voltage applied to the piezoelectric elements 132.

Figure 9:
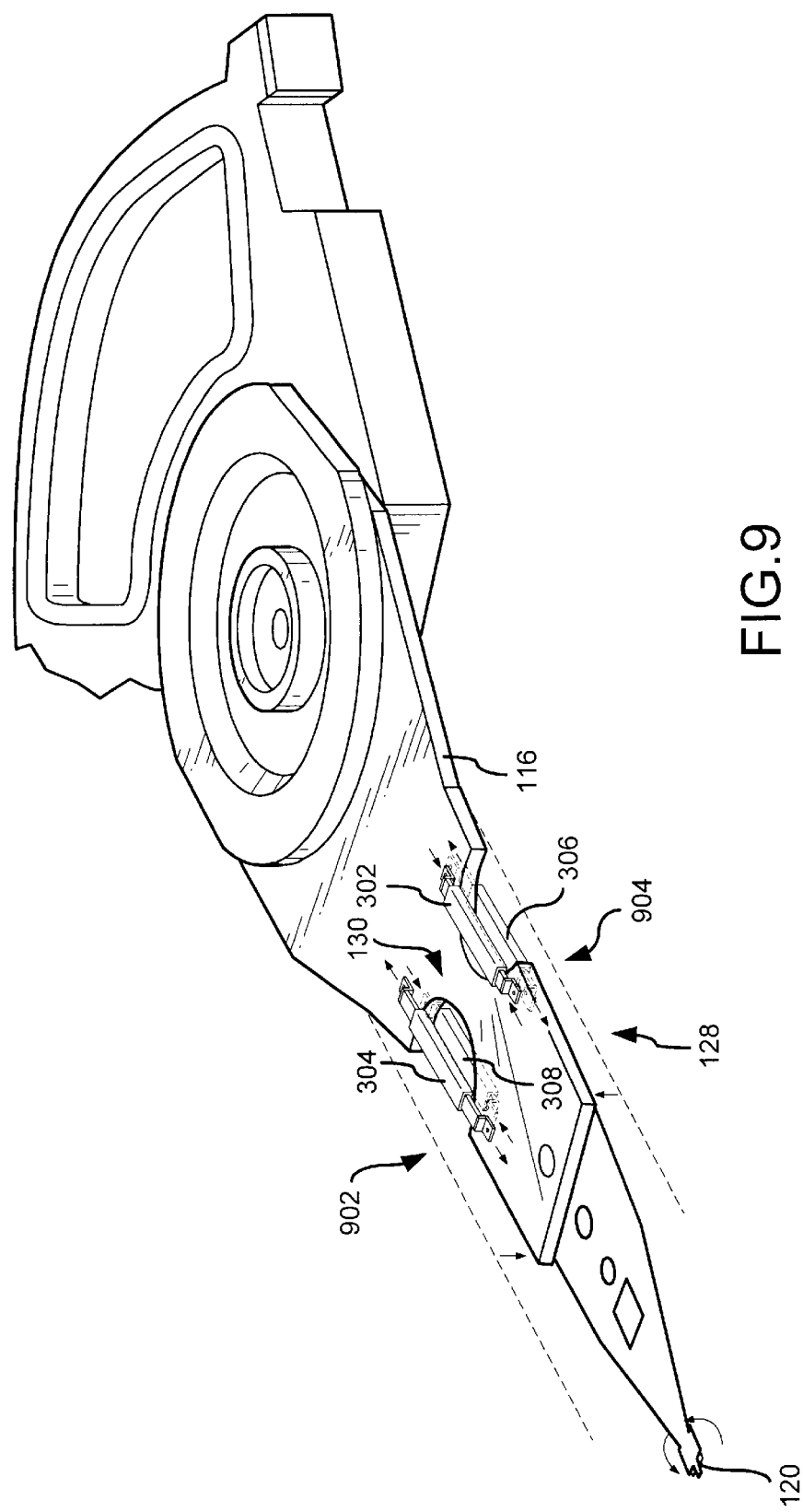
FIG. 9 shows a piezoelectric assembly rolling the data transducer in a counterclockwise direction as contemplated by the present invention.
Figure 10:
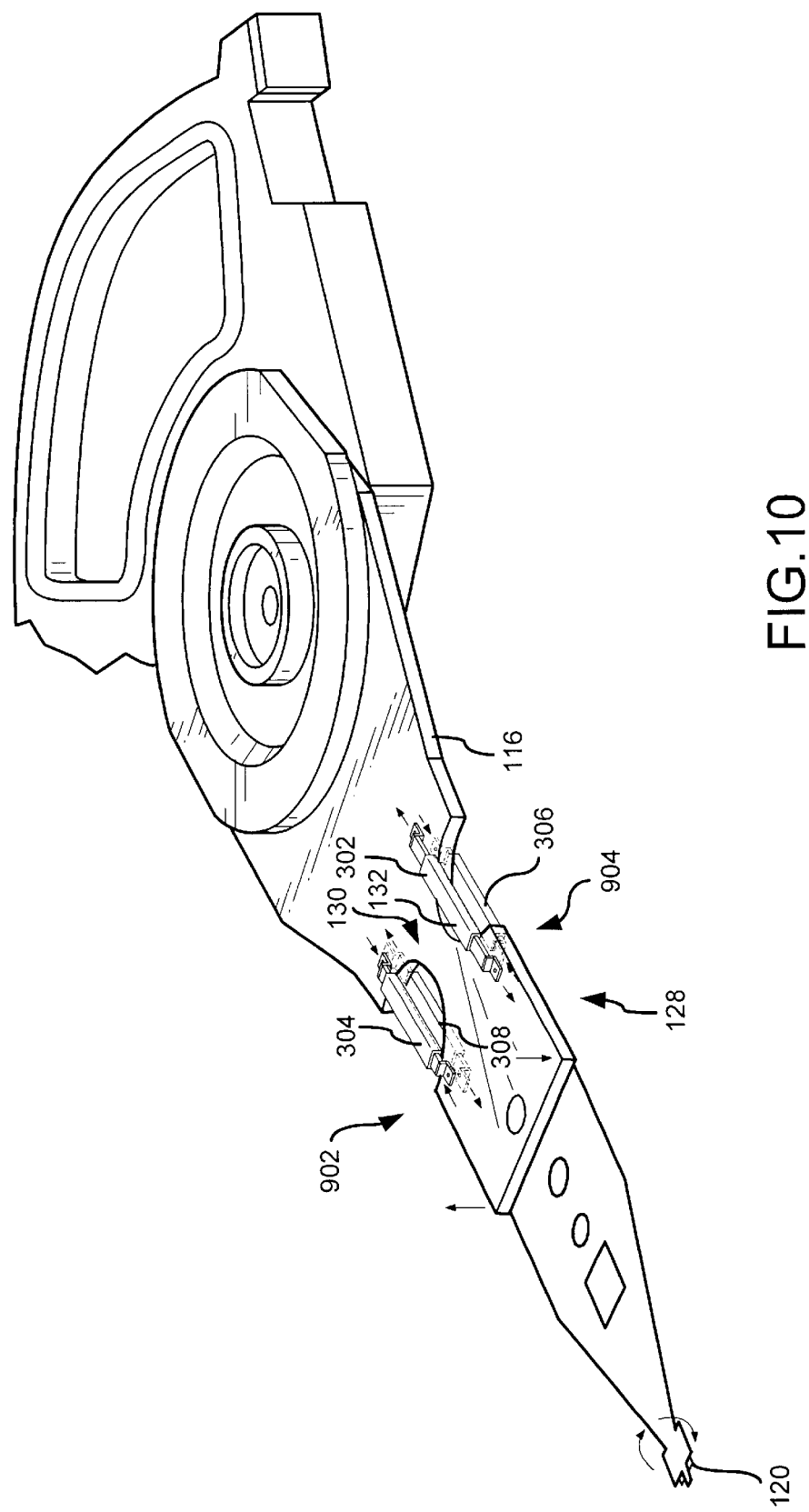
FIG. 10 shows a piezoelectric assembly rolling the data transducer in a clockwise direction as contemplated by the present invention.

In another embodiment of the present invention, the piezoelectric assembly 128 can be configured to twist the actuator arm 116 and roll the data transducer 120 in a clockwise and counterclockwise direction. As mentioned earlier, contact between the data transducer 120 and the data disc 110 can occur due to twisting forces when the actuator arm 116 is rapidly accelerated to a new radial position along the data disc 110. In addition, the data transducer 120 may roll and catch the data disc 110 while being loaded and unloaded to and from a transducer parking-ramp. The piezoelectric assembly 128 helps reduce such transducer-disc contact by twisting the actuator arm 116 to substantially cancel out transducer roll motion. For example, in FIG. 9, voltages are applied to the top-left piezoelectric element 304 and the bottom-right piezoelectric element 306 which cause their lengths to increase, while voltages are applied to the top-right piezoelectric element 302 and the bottom-left piezoelectric element 308 which cause their lengths to decrease. As a result, the left side 902 of the actuator arm 116 is moved downwardly along the arm pivot 130 and the right side 904 of the actuator arm 116 is moved upwardly along the arm pivot 130, thus rolling the data transducer 120 in a counterclockwise direction. By reversing the polarity of the voltage applied to the piezoelectric elements 132 the data transducer 120 can be rolled clockwise, as shown in FIG. 10. Specifically, the left side 902 of the actuator arm 116 is moved upwardly by increasing the lengths of the top-right piezoelectric element 302 and the bottom-left piezoelectric element 308, while the right side 904 of the actuator arm 116 is moved downwardly by decreasing the lengths of the top-left piezoelectric element 304 and the bottom-right piezoelectric element 306.

In another embodiment of the present invention, the piezoelectric assembly 128 is utilized to position the data transducer 120 at an optimal transducer fly height and to detect imminent disc crash conditions. This embodiment takes advantage of the well-known electrical polarizing property of crystals when they are subjected to mechanical pressure. The polarizing property causes the piezoelectric elements 132 to produce a small amount of electrical potential when the data transducer 120 makes contact with the data disc 110.

Figure 11:
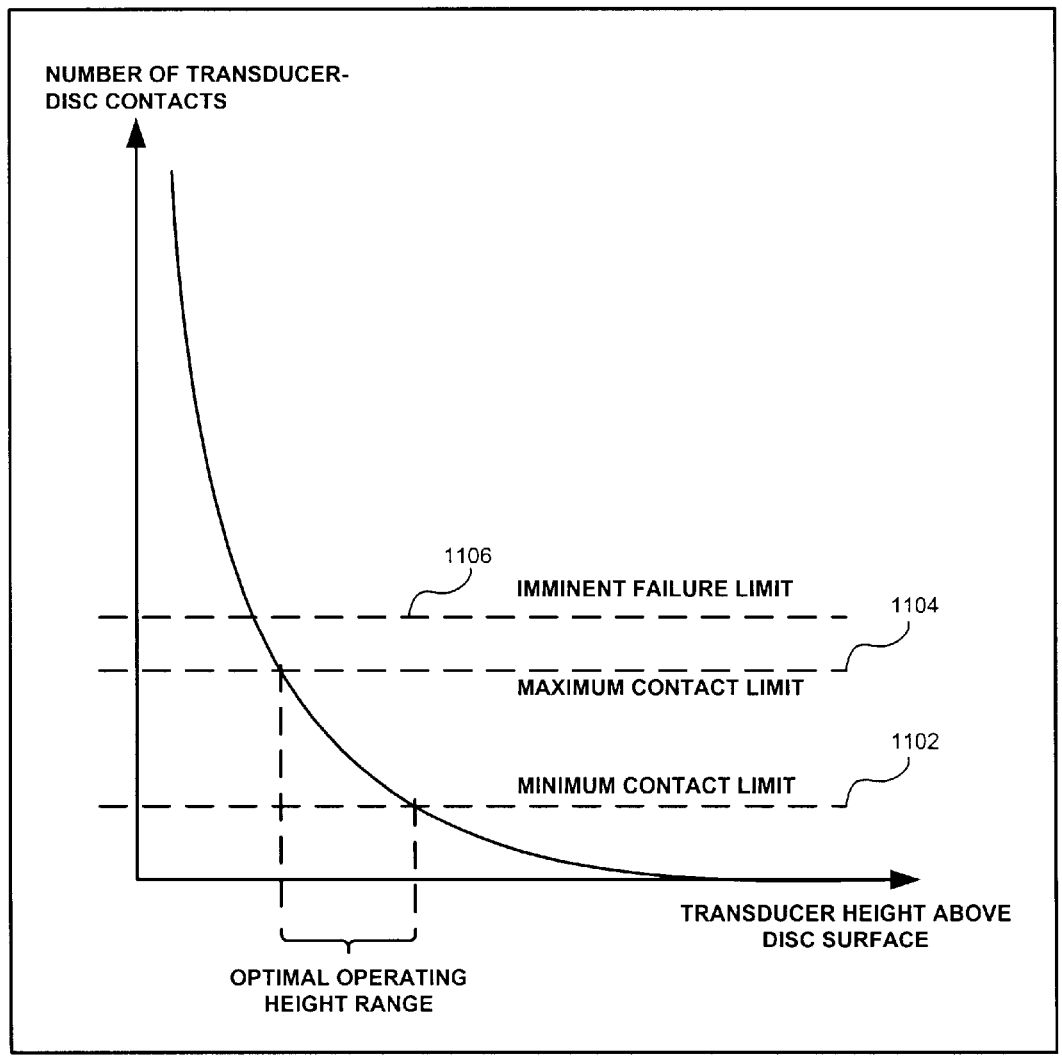
FIG. 11 shows a graphical diagram of an optimal transducer operating height range for one embodiment of the present invention.

To more fully describe this embodiment of the invention, reference is made to the exemplary graph of FIG. 11. It is observed from FIG. 11 that an optimal transducer fly height range (e.g., the best data storage density vs. transducer-disc contact) is achieved when a small number of transducer-disc contact occur. The optimal transducer fly height can be characterized as residing between a minimum contact limit 1102 and a maximum contact limit 1104. Thus, if the frequency of transducer-disc contact is below the minimum contact limit 1102, the data transducer is flying too far from the data disc. If the frequency of transducer-disc contact is above the maximum contact limit 1104, the data transducer is flying too close to the data disc. Moreover, if the frequency of transducer-disc contact increases beyond an imminent failure limit 1106 (also referred to as the glide avalanche limit), this indicates that too much debris has accumulated on the data disc and a disc crash is expected in the near future.

Figure 12:
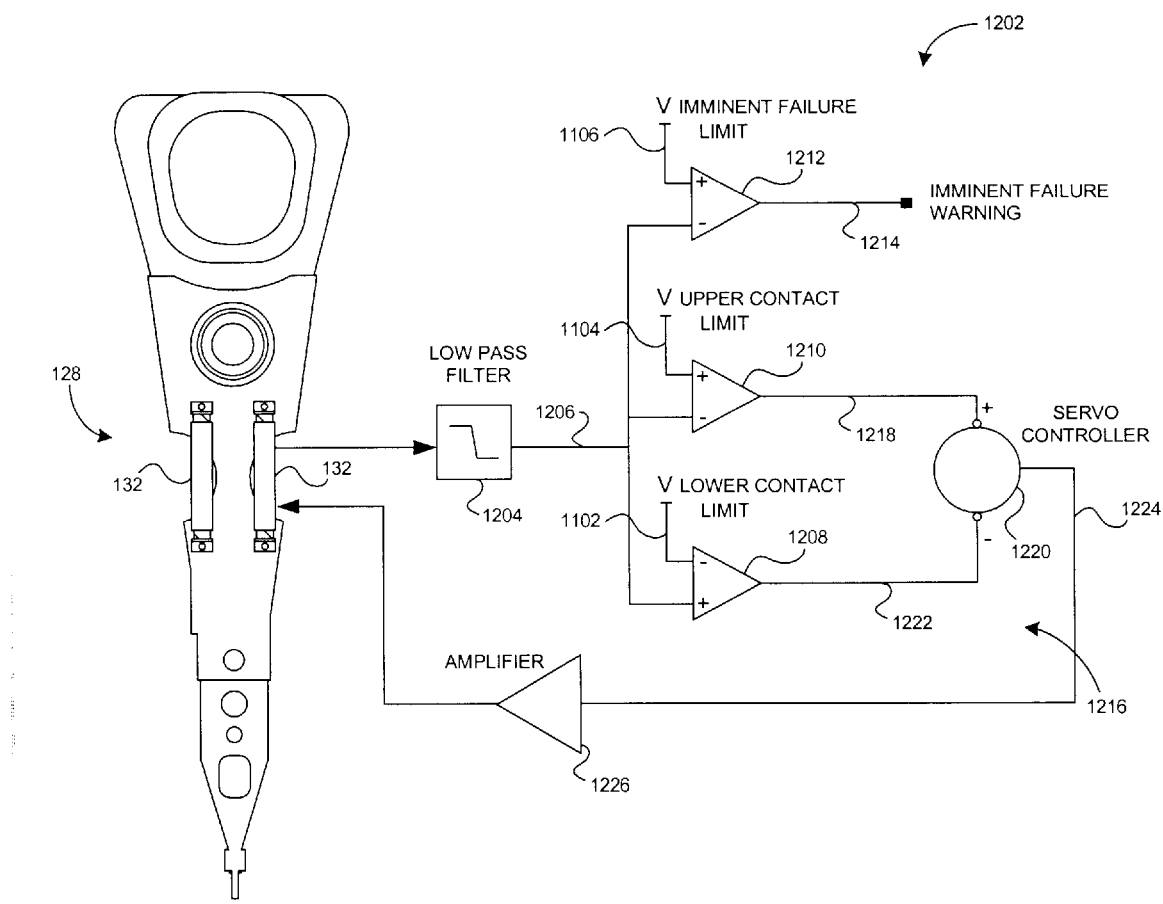
FIG. 12 shows a functional diagram of a servo unit configured to position the data transducer at an optimal transducer fly height and to detect imminent disc crash conditions in accordance with the present invention.

In FIG. 12, a functional diagram of a servo unit 1202 configured to position the data transducer 120 at an optimal transducer fly height and to detect imminent disc crash conditions is shown. It should be noted that the servo unit 1202 may be implemented as hardware, software, or a combination thereof, and may include a microprocessor or other digital state machine circuit. The piezoelectric elements 132 are coupled with the servo unit 1202 through a low pass filter 1204. The low pass filter 1204 produces an output signal 1206 proportional to the average transducer-disc contact occurring during the disc drive's operation. The filter output 1206 is coupled to an upper comparator 1208, a lower comparator 1210, and a crash comparator 1212.

The crash comparator 1212 compares the low pass filter output 1206 against the imminent failure limit 1106. If the low pass filter output 1206 is greater than the imminent failure limit 1106, the crash comparator 1212 outputs an imminent failure signal 1214. The imminent failure signal 1214 is intended to alert the host that a disc crash is expected and that backup of disc data is advisable.

The upper comparator 1210 and the lower comparator 1208 form part of a feedback loop 1216 which keeps the transducer fly height within an optimal range. The upper comparator 1210 measures the lowpass filter output 1206 against the upper contact limit 1104. If the lowpass filter output 1206 is greater than the upper contact limit 1104, an upper comparator output signal 1218 notifies a servo controller 1220 to increase the transducer fly height. Similarly, the lower comparator 1208 measures the lowpass filter output 1206 against the lower contact limit 1102. If the lowpass filter output 1206 is less than the lower contact limit 1102, a lower comparator output signal 1222 notifies the servo controller 1220 to decrease the transducer fly height. The servo controller output 1224 is coupled with a power amplifier 1226. The power amplifier 1226 is configured to boost the servo controller output signal 1224 and drive the piezoelectric elements 132. In this manner, the feedback loop 1216 is completed and the transducer fly height is maintained within an optimal range.

Figure 13:
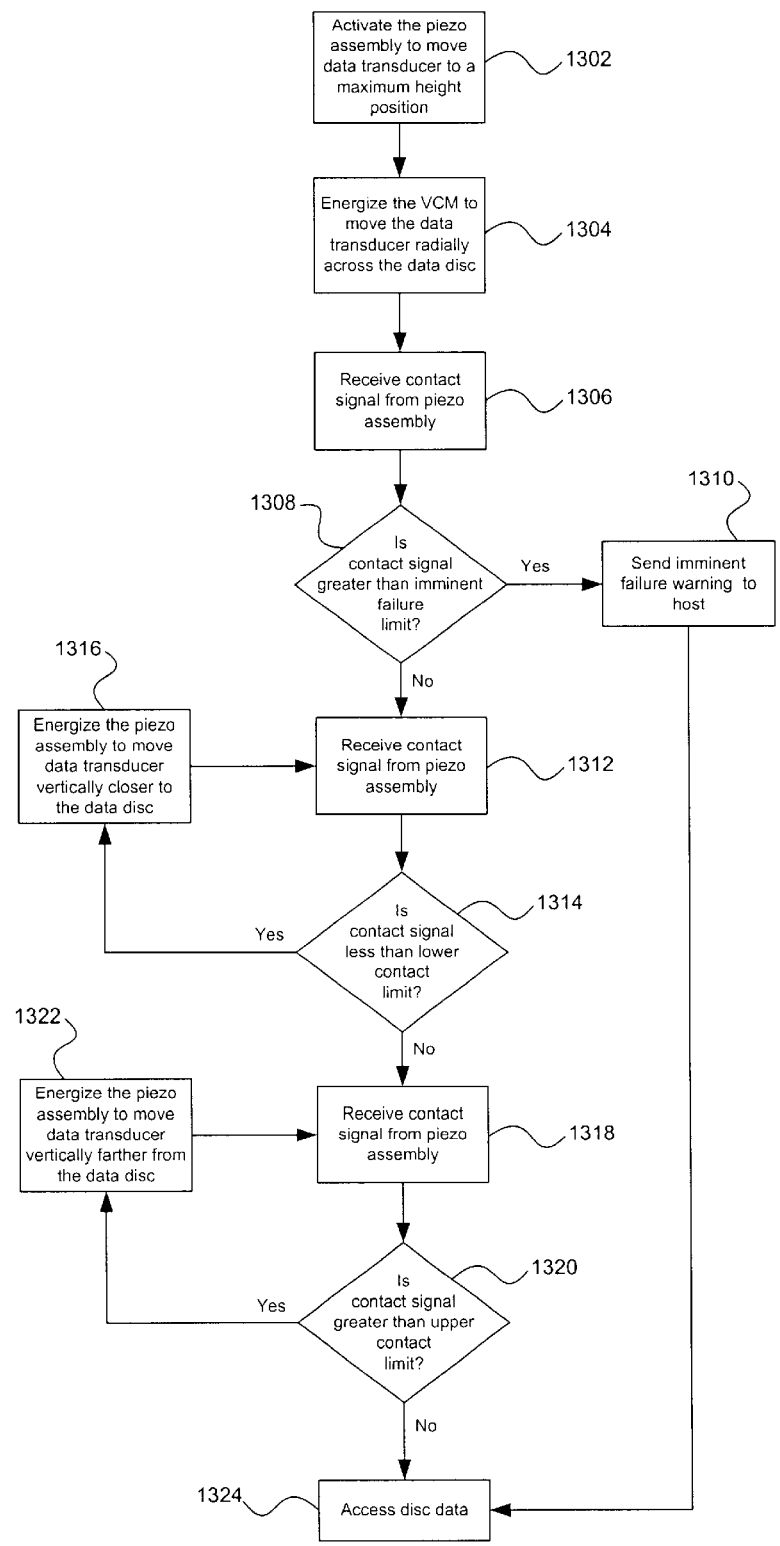
FIG. 13 shows an operational flow diagram of one embodiment of the present invention.

In FIG. 13, an operational flow diagram of one embodiment of the present invention is shown. It is contemplated that the steps of FIG. 13 can be repeated for every data access (read or write) operation, or performed once as part of a disc drive power-up procedure.

At step 1302, the piezoelectric assembly is activated such that the data transducer is raised to a maximum fly height level. Next, at step 1304, the data transducer is moved radially across the data disc using the voice coil motor. At step 1306, a contact signal from the piezoelectric assembly is received. At step 1308, the contact signal is compared to the imminent failure limit. If the contact signal is determined to be greater than the imminent failure limit, an imminent failure warning is sent to the host at step 1310 and the disc access operation is then performed.

If the contact signal is less than or equal to the imminent failure limit, flow continues to step 1312, where the contact signal is again sampled. Next, at step 1314, the contact signal is tested against the lower contact limit. If the contact signal is less than the lower contact limit, step 1316 is executed. At step 1316, the piezoelectric assembly is energized to move the data transducer closer to the data disc. After step 1316, the operation flow is returned to steps 1312 and 1314, where the contact signal is once again compared to the lower contact limit.

Once the transducer fly height is adjusted such that the contact signal is greater than or equal to the lower contact limit, operation flow continues to steps 1318 and 1320. During these steps, the contact signal is detected and compared to the upper contact limit. If, at step 1320, the contact signal is greater than the upper contact limit, control passes to step 1322. At step 1322, the piezoelectric assembly is energized to move the data transducer vertically farther from the data disc. Steps 1318 and 1320 are then repeated until the contact signal from the piezoelectric assembly becomes less than or equal to the upper contact limit. Finally, at step 1324, the data access operation is performed.

Figure 14:
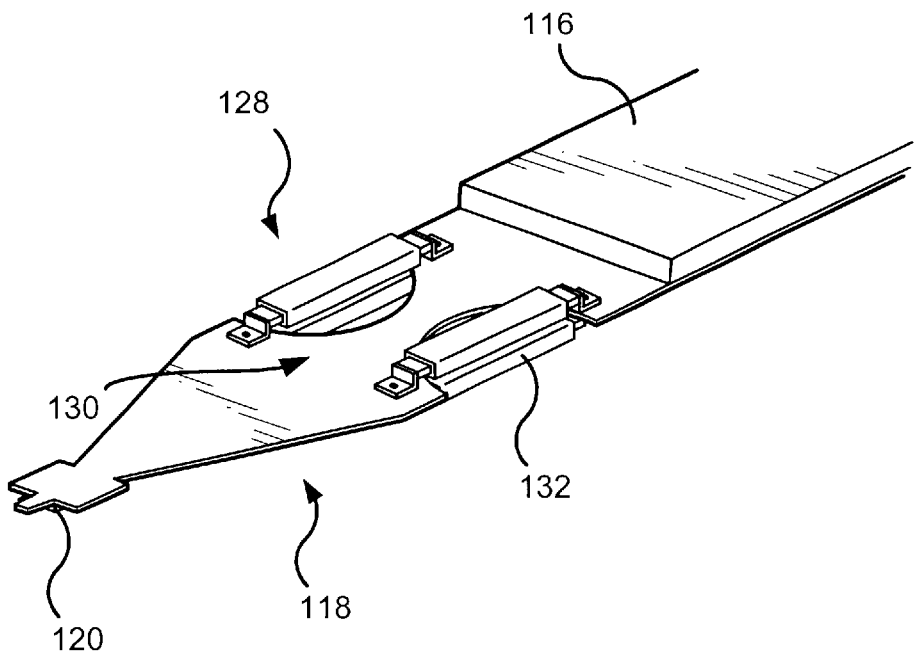
FIG. 14 shows another embodiment of the present invention with the piezoelectric assembly mounted on a head gimbal assembly.
Figure 15:
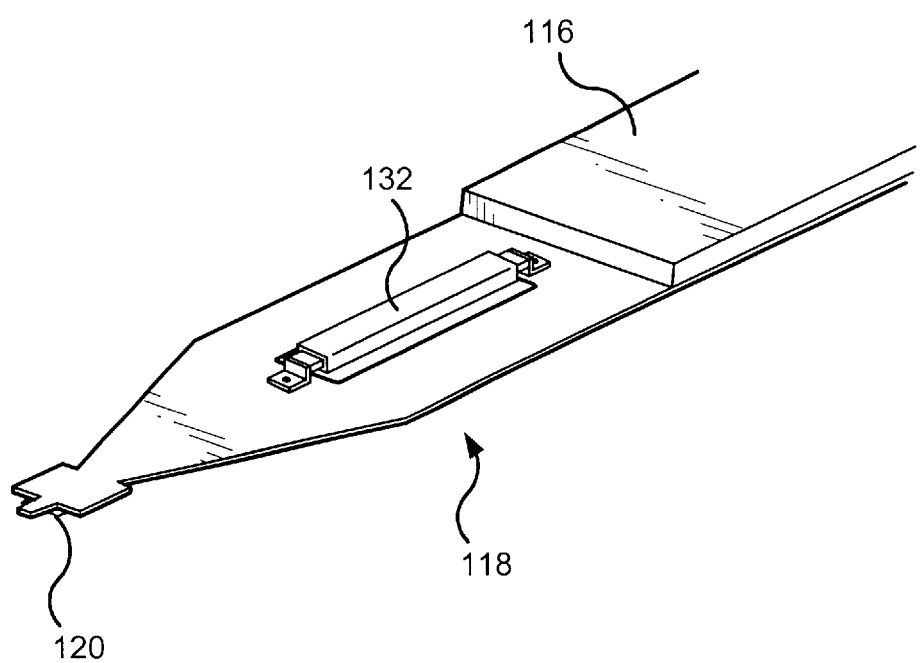
FIG. 15 shows another embodiment of the present invention with the piezoelectric assembly containing one piezoelectric element for vertical movement of the data transducer.

In FIG. 14, another embodiment of present invention is shown. As depicted, the piezoelectric assembly 128 is mounted on the head gimbal assembly 118 rather than the actuator arm 116. The piezoelectric assembly 128 of FIG. 14 is still configured to provide vertical, horizontal, and rotational movement of the transducer 120 along the arm pivot 130 as previously described. In FIG. 15, the piezoelectric assembly 128 is shown mounted on the head gimbal assembly 118 having a single piezoelectric element 132 for vertical movement of the transducer 120.

In summary, and in view of the foregoing discussion, it will be understood that one embodiment of the present invention provides an actuator arm (such as 116) for a disc drive (such as 102) having at least one data disc (such as 110). The actuator arm (such as 116) includes a data transducer (such as 120) coupled with the actuator arm (such as 116) for reading and writing data from and to the data disc (such as 110). The actuator arm (such as 116) also includes a piezoelectric assembly (such as 128) with at least one piezoelectric element (such as 132). The piezoelectric element (such as 132) is configured to vertically displace the data transducer (such as 120) when it is energized. The actuator arm (such as 116) further includes the arm pivot including pivot gaps (such as 206 and 208) on both sides of the arm pivot.

The piezoelectric element (such as 132) may be a lead zirconate titanate piezoelectric. The piezoelectric element (such as 132) may also be a low voltage piezoelectric element.

The piezoelectric assembly (such as 128) may include at least one top piezoelectric element (such as 302 or 304) and at least one bottom piezoelectric element (such as 306 or 308). Similarly, the piezoelectric assembly (such as 128) may include at least one left piezoelectric element (such as 304 or 308) and at least one right piezoelectric element (such as 302 or 306). Furthermore, the piezoelectric assembly may include a top right piezoelectric element (such as 302), a top left piezoelectric element (such as 304), a bottom left piezoelectric element (such as 308), and a bottom right piezoelectric element (such as 306).

The piezoelectric assembly (such as 128) may be configured to roll the data transducer (such as 120) in clockwise and counterclockwise direction. The piezoelectric assembly (such as 128) can also be configured to radially displace the data transducer (such as 120) across the data disc (such as 110).

In another embodiment of the invention, a method of positioning a data transducer (such as 120) for reading and writing data from and to a data disc (such as 110) is provided. The method includes the step of energizing an actuator assembly motor such that the data transducer moves substantially radially across the data disc (such as 1304). The method also includes the step of applying a position signal to at least one piezoelectric element mounted on the actuator arm, and thereby causing the piezoelectric element to vertically displace the data transducer with respect to the data disc in response to the position signal (such as 1316 and 1322).

The method may further involve the steps of detecting a contact signal from the piezoelectric element (such as 1318), comparing the contact signal to an upper contact limit (such as 1320) and, if the contact signal is greater than the upper contact limit, modifying the position signal to the piezoelectric element until the contact signal is less than the upper contact limit (such as 1322). In addition, the method can include the steps of comparing the contact signal to an lower contact limit (such as 1312) and, if the contact signal is less than the lower contact limit, modifying the position signal to the piezoelectric element until the contact signal is greater than the lower contact limit (such as 1316).

Another aspect of the method includes an actuator arm (such as 116) for a disc drive (such as 102) having at least one data disc (such as 110). The actuator arm (such as 116) includes a data transducer (such as 120) coupled with the actuator arm (such as 116) for reading and writing data from and to the data disc (such as 110). A piezoelectric assembly (such as 128) including at least one piezoelectric element (such as 132), is configured to vertically displace the data transducer (such as 120) when the piezoelectric element (such as 132) is energized. The piezoelectric assembly (such as 128) provides a contact signal proportional to a rate of contact between the data transducer (such as 120) and the data disc (such as 110). The actuator arm (such as 116) further includes a servo unit (such as 1202) coupled to the piezoelectric assembly (such as 128), wherein the servo unit (such as 1202) is configured to energize the piezoelectric assembly (such as 128) in response to the contact signal such that a feedback loop (such as 1216) is formed.

The servo unit (such as 1202) may be further configured to decrease a fly height of the data transducer (such as 120) when the contact signal is less than a lower contact limit (such as 1102). The servo unit (such as 1202) may include a lower comparator (such as 1208) configured to detect when the contact signal is less than the lower contact limit (such as 1102). The servo unit (such as 1202) may also be configured to increase a fly height of the data transducer (such as 120) when the contact signal is greater than an upper contact limit (such as 1104). The servo unit (such as 1202) may include an upper comparator (such as 1210) configured to detect when the contact signal is greater than the upper contact limit (such as 1104). The servo unit (such as 1202) may be configured to provide an imminent failure warning (such as 1214) when the contact signal is greater than an imminent failure limit (such as 1106).

Another aspect of the method includes the steps of detecting a contact signal from the piezoelectric element (such as 1306) and comparing the contact signal to an imminent failure limit (such as 1308). If the contact signal is greater than the imminent failure limit, the method further involves the step of issuing an imminent failure warning (such as 1310).

It will be clear that the present invention is well adapted to attain the ends and advantages mentioned as well as those inherent therein. While the presently preferred embodiments have been described for purposes of this disclosure, various changes and modifications may be made which are well within the scope of the present invention. For example, the present invention may be adapted for use in an optical disc drive configuration, such as a Compact Disk (CD) or Digital Versatile Disk (DVD). Thus, numerous other changes, combinations, and arrangements of techniques may be made which will readily suggest themselves to those skilled in the art and which are encompassed in the spirit of the invention disclosed and as defined in the appended claims.

What is claimed is:

1. A method of positioning a data transducer for reading and writing data from and to a data disc wherein the data disc rotates at a constant speed, the method comprising:

(a) energizing an actuator assembly motor such that the data transducer moves substantially radially across the rotating data disc;

(b) detecting a number of transducer-disc contacts based on a contact signal from at least one piezoelectric element mounted on the actuator arm, wherein the contact signal is generated by contact between the data transducer and the rotating data disc; and (c) applying a position signal to the piezoelectric element in response to the number of transducer-disc contacts, the piezoelectric element vertically displacing the data transducer with respect to the data disc in response to the position signal.

2. The method of claim 1, further comprising:

(d) comparing the number of transducer-disc contacts to an upper contact number limit; and (e) if the number of transducer-disc contacts is greater than the upper contact number limit, modifying the position signal to the piezoelectric element until the number of transducer-disc contacts is less than the upper contact number limit.

3. The method of claim 2, further comprising:

(f) comparing the number of transducer-disc contacts to a lower contact number limit; and (g) if the number of transducer-disc contacts is less than the lower contact number limit, modifying the position signal to the piezoelectric element until the number of transducer-disc contacts is greater than the lower contact number limit.

4. The method of claim 1, further comprising:

(d) comparing the number of transducer-disc contacts to a number of transducer-disc contacts representing an imminent failure limit; and (e) if the number of transducer-disc contacts is greater than the imminent failure limit, issuing an imminent failure warning.

5. An actuator arm for a disc drive, the disc drive having at least one rotating data disc, the actuator arm comprising:

(a) a data transducer coupled with the actuator arm for reading and writing data from and to the data disc;

(b) a piezoelectric assembly including at least one piezoelectric element, the piezoelectric assembly configured to vertically displace the data transducer when the piezoelectric element is energized, the piezoelectric assembly providing a contact signal indicating contact between the data transducer and the rotating data disc;

(c) a low pass filter coupled with the piezoelectric assembly to receive the contact signal and produce an output signal proportional to a number of transducer-disc contacts; and (d) a servo unit coupled to the piezoelectric assembly and low pass filter, wherein the servo unit is configured to energize the piezoelectric assembly in response to the number of transducer-disc contacts such that a feedback loop is formed.

6. The actuator arm of claim 5, wherein the servo unit is configured to decrease a fly height of the data transducer when the number of transducer-disc contacts is less than a lower contact number limit.

7. The actuator arm of claim 6, wherein the servo unit includes a lower comparator configured to detect when the number of transducer-disc contacts is less than the lower contact number limit.

8. The actuator arm of claim 5, wherein the servo unit is configured to increase a fly height of the data transducer when the number of transducer-disc contacts is greater than an upper contact number limit.

9. The actuator arm of claim 8, wherein the servo unit includes an upper comparator configured to detect when the number of transducer-disc contacts is greater than the upper contact number limit.

10. The actuator arm of claim 5, wherein the servo unit is configured to provide an imminent failure warning when the number of transducer-disc contacts is greater than a number of transducer-disc contacts indicating an imminent failure limit.

11. The actuator arm of claim 5, further comprising an arm pivot biasing the actuator arm to a rest position.

12. The actuator arm of claim 5, wherein the piezoelectric assembly includes a top right piezoelectric element, a top left piezoelectric element, a bottom left piezoelectric element, and a bottom right piezoelectric element.

13. The actuator arm of claim 12, wherein the piezoelectric assembly is further configured to roll the data transducer clockwise and counterclockwise.

14. An actuator arm for a disc drive, the disc drive having at least one data disc, the actuator arm comprising:
(a) a data transducer coupled with the actuator arm for reading and writing data from and to the data disc; and
(b) a means for displacing the data transducer relative to the data disc in response to a number of contacts between the data transducer and the data disc.

15. The actuator arm of claim 14, wherein the means for displacing the data transducer is configured to decrease a fly height of the data transducer when the number of contacts is less than a lower contact number limit.

16. The actuator arm of claim 15, wherein the means for displacing the data transducer includes a lower comparator configured to detect when the number of contacts is less than the lower contact number limit.

17. The actuator arm of claim 14, wherein the means for displacing the data transducer is configured to increase a fly height of the data transducer when the number of contacts is greater than an upper contact number limit.

18. The actuator arm of claim 17, wherein the means for displacing the data transducer includes an upper comparator configured to detect when the number of contacts is greater than the upper contact number limit.

19. The actuator arm of claim 14, wherein the means for displacing the data transducer is configured to provide an imminent failure warning when the number of contacts is greater than a number of transducer-disc contacts representing an imminent failure limit.

20. The actuator arm of claim 14, wherein the means for displacing the data transducer comprises a top right piezoelectric element, a top left piezoelectric element, a bottom left piezoelectric element, and a bottom right piezoelectric element.

21. The actuator arm of claim 20, wherein the means for displacing the data transducer is further configured to roll the data transducer clockwise and counterclockwise.

* * * * *